United States Patent
Guan et al.

(10) Patent No.: US 12,104,482 B2
(45) Date of Patent: Oct. 1, 2024

(54) INTEGRATED CURRENT LOAD AS WELLHEAD FATIGUE DAMAGE RATE INDICATOR

(71) Applicant: Chevron U.S.A. Inc., San Ramon, CA (US)

(72) Inventors: Xiaorui Guan, Sugar Land, TX (US); Wangming Lu, Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 90 days.

(21) Appl. No.: 17/941,733

(22) Filed: Sep. 9, 2022

(65) Prior Publication Data
US 2024/0084692 A1    Mar. 14, 2024

(51) Int. Cl.
| | |
|---|---|
| *E21B 47/007* | (2012.01) |
| *E21B 17/01* | (2006.01) |
| *E21B 33/035* | (2006.01) |
| *E21B 47/001* | (2012.01) |
| *E21B 47/01* | (2012.01) |
| *G01F 1/00* | (2022.01) |

(52) U.S. Cl.
CPC .......... *E21B 47/007* (2020.05); *E21B 17/012* (2013.01); *E21B 33/0355* (2013.01); *E21B 47/001* (2020.05); *E21B 47/01* (2013.01); *G01F 1/00* (2013.01)

(58) Field of Classification Search
CPC ...... E21B 47/007; E21B 47/001; E21B 47/01; E21B 17/012; E21B 33/0355; G01F 1/00
See application file for complete search history.

(56) References Cited

U.S. PATENT DOCUMENTS

| | | | | |
|---|---|---|---|---|
| 7,194,913 | B2* | 3/2007 | Morrison | E21B 17/015 73/800 |
| 8,074,720 | B2* | 12/2011 | Radi | G06K 7/00 702/6 |
| 8,725,429 | B2* | 5/2014 | McNeill | E21B 47/001 702/34 |
| 9,593,568 | B1* | 3/2017 | LeMonds | E21B 47/007 |
| 11,261,722 | B2* | 3/2022 | Cain | G01M 5/0025 |
| 2014/0374113 | A1 | 12/2014 | Kebadze | |
| 2014/0374116 | A1 | 12/2014 | Kelso | |
| 2018/0320502 | A1* | 11/2018 | Turner | B63B 35/03 |
| 2021/0115780 | A1* | 4/2021 | Hyland | G01M 5/0075 |

FOREIGN PATENT DOCUMENTS

NO    20150828    6/2015

OTHER PUBLICATIONS

A New Quantitative Assessment of Current Profile Clustering Methods for Riser Engineering—OMAE2015-41429, V001T01A006.

(Continued)

*Primary Examiner* — Aaron L Lembo
(74) *Attorney, Agent, or Firm* — ESPLIN & ASSOCIATES, PC

(57) ABSTRACT

Current profile of water (e.g., ocean) around a riser connected to a wellhead may be measured and used to determine integrated current load on the riser at any given moment in time. The integrated current load may be used to estimate the wellhead fatigue damage rate at that moment in time. The estimated wellhead fatigue damage rate may be used to make operational decisions for the well.

20 Claims, 5 Drawing Sheets

(56) References Cited

OTHER PUBLICATIONS

An extreme value prediction method based on clustering algorithm—Reliability Engineering & System Saety, vol. 222, Jun. 2022, 108442.

Introducing multi-round clustering on capturing the multidirectional extreme current profile for deep-water ROV operation—Ocean Engineering vol. 233, Aug. 1, 2021, 109205.

* cited by examiner

INTEGRATED CURRENT LOAD AS WELLHEAD FATIGUE DAMAGE RATE INDICATOR

FIELD

The present disclosure relates generally to the field of using integrated current load as wellhead fatigue damage rate indicator.

BACKGROUND

Operation of an underwater well (e.g., subsea well) may result in wellhead fatigue damage. Inaccurate estimation of wellhead fatigue damage accumulation may result in underuse or overuse of the wellhead. Accurate estimation of wellhead fatigue damage accumulation is required to make informed decisions on future operations of the underwater well.

SUMMARY

This disclosure relates to using integrated current load as wellhead fatigue damage rate indicator. Current profile information and/or other information may be obtained. The current profile information may define a current profile across a water column along a riser above a wellhead. The current profile across the water column along the riser may characterize the speed of water movement across the water column along the riser. Integrated current load on the riser may be determined based on the current profile across the water column above the wellhead and/or other information. A wellhead fatigue damage rate for the wellhead may be determined based on the integrated current load on the riser and/or other information. One or more well operations may be facilitated based on the wellhead fatigue damage rate for the wellhead and/or other information.

A system for using integrated current load as wellhead fatigue damage rate indicator may include one or more electronic storage, one or more processors and/or other components. The electronic storage may store information relating to a wellhead, information relating to a riser above the wellhead, current profile information, information relating to speed of water movement across a water column along the riser, information relating to integrated current load on the riser, information relating to wellhead fatigue damage rates, information relating to well operations, and/or other information.

The processor(s) may be configured by machine-readable instructions. Executing the machine-readable instructions may cause the processor(s) to facilitate using integrated current load as wellhead fatigue damage rate indicator. The machine-readable instructions may include one or more computer program components. The computer program components may include one or more of a current profile component, an integrated current load component, a wellhead fatigue component, a well operation component, and/or other computer program components.

The current profile component may be configured to obtain current profile information and/or other information. The current profile information may define a current profile across a water column along a riser above a wellhead. The current profile across the water column along the riser may characterize speed of water movement across the water column along the riser. The riser may be connected to the wellhead.

The integrated current load component may be configured to determine integrated current load on the riser. The integrated current load on the riser may be determined based on the current profile across the water column along the riser and/or other information.

In some implementations, determination of the integrated current load on the riser may include forecasting of the integrated current load on the riser for a future duration of time.

The wellhead fatigue component may be configured to determine one or more wellhead fatigue damage rates for the wellhead. The wellhead fatigue damage rate(s) for the wellhead may be determined based on the integrated current load on the riser and/or other information.

In some implementations, determination of the wellhead fatigue damage rate(s) for the wellhead based on the integrated current load on the riser may include estimation of the wellhead fatigue damage rate(s) based on a relationship (e.g., regression) between historical integrated current loads on the riser and historical wellhead fatigue damage rates for the wellhead.

In some implementations, the historical integrated current loads throughout the water column may be weighted differently for determination of the relationship (e.g., regression) between the historical integrated current loads on the riser and the historical wellhead fatigue damage rates for the wellhead.

In some implementations, determination of the wellhead fatigue damage rate(s) for the wellhead may include forecasting of the wellhead fatigue damage rate(s) for the future duration of time based on the forecasting of the integrated current load on the riser for the future duration of time.

The well operation component may be configured to facilitate one or more well operations. The well operation(s) may be facilitated based on wellhead fatigue damage rate(s) for the wellhead and/or other information.

In some implementations, facilitation of the well operation(s) based on the wellhead fatigue damage rate(s) for the wellhead may include presentation of the wellhead fatigue damage rate(s) for the wellhead on one or more displays.

In some implementations, facilitation of the well operation(s) based on the wellhead fatigue damage rate(s) for the wellhead may further include presentation of a wellhead fatigue damage accumulation on the display(s)

In some implementations, facilitation of the well operation(s) based on the wellhead fatigue damage rate(s) for the wellhead may include monitoring remaining allowable wellhead fatigue damage based on a wellhead fatigue damage accumulation.

In some implementations, facilitation of the well operation(s) based on the wellhead fatigue damage rate(s) for the wellhead may include disconnection of the riser from the wellhead based on a wellhead fatigue damage accumulation for a specific operational event exceeding a fatigue allowance for the specific operational event. The wellhead fatigue damage accumulation for the specific operational event may be determined based on the wellhead fatigue damage rate and a duration of the specific operational event.

In some implementations, facilitation of the well operation(s) based on the wellhead fatigue damage rate(s) for the wellhead may further include permitting the well operation(s) for the specific operational event based on the wellhead fatigue damage accumulation for the specific operational event not exceeding the fatigue allowance for the specific operational event.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to using integrated current load as wellhead fatigue damage rate indicator. Current profile of water (e.g., ocean) around a riser connected to a wellhead may be measured and used to determine integrated current load on the riser at any given moment in time. The integrated current load may be used to estimate the wellhead fatigue damage rate at that moment in time. The estimated wellhead fatigue damage rate may be used to make operational decisions for the well.

Figure 1:
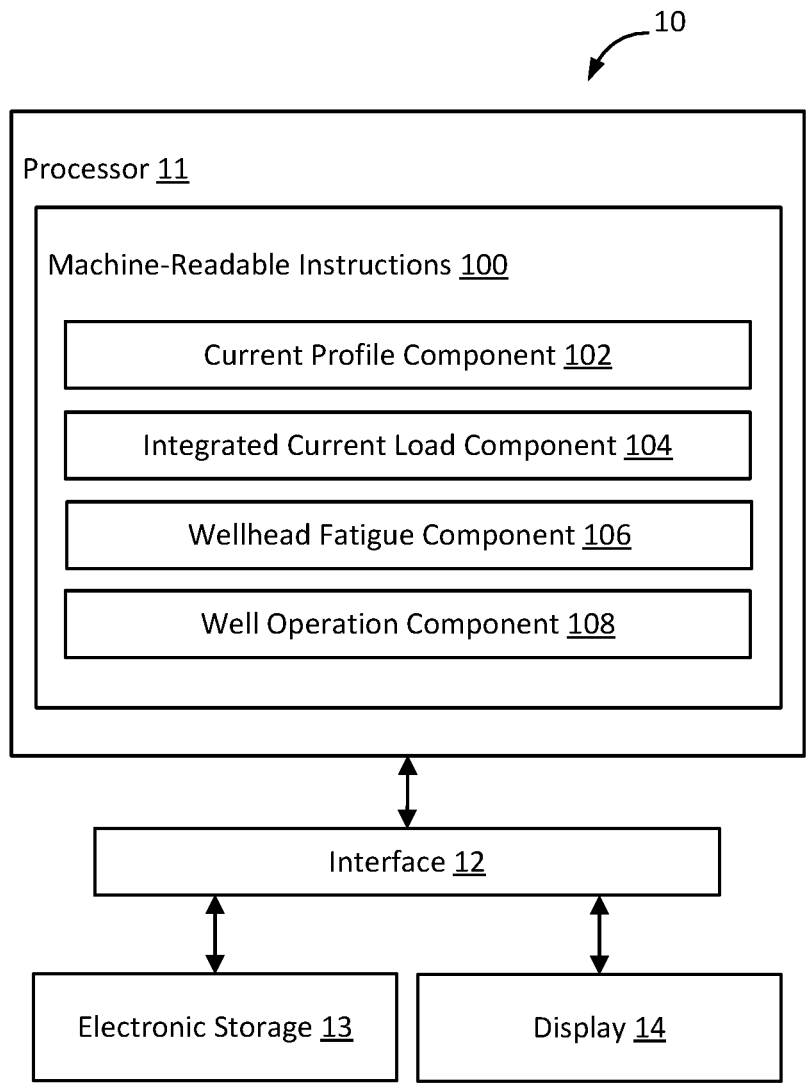
FIG. 1 illustrates an example system for using integrated current load as wellhead fatigue damage rate indicator.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a display 14, and/or other components. Current profile information and/or other information may be obtained by the processor 11. The current profile information may define a current profile across a water column along a riser above a wellhead. The current profile across the water column along the riser may characterize the speed of water movement across the water column along the riser. Integrated current load on the riser may be determined by the processor 11 based on the current profile across the water column above the wellhead and/or other information. A wellhead fatigue damage rate for the wellhead may be determined by the processor 11 based on the integrated current load on the riser and/or other information. One or more well operations may be facilitated by the processor 11 based on the wellhead fatigue damage rate for the wellhead and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to a wellhead, information relating to a riser above the wellhead, current profile information, information relating to speed of water movement across a water column along the riser, information relating to integrated current load on the riser, information relating to wellhead fatigue damage rates, information relating to well operations, and/or other information.

The display 14 may refer to an electronic device that provides visual presentation of information. The display 14 may include a color display and/or a non-color display. The display 14 may be configured to visually present information. The display 14 may present information using/within one or more graphical user interfaces. For example, the display 14 may present information relating to a wellhead, information relating to a riser above the wellhead, current profile information, information relating to speed of water movement across a water column along the riser, information relating to integrated current load on the riser, information relating to wellhead fatigue damage rates, information relating to well operations, and/or other information.

A well may refer to a hole or a tunnel in the ground. A well may be drilled in one or more directions. For example, a well may include a vertical well, a horizontal well, a deviated well, and/or other type of well. A well may be drilled in the ground for exploration and/or recovery of natural resources in the ground. For example, a well may be drilled in the ground to aid in extraction of petrochemical fluid (e.g., oil, gas, petroleum, fossil fuel). Application of the present disclosure to other types of wells and wells drilled for other purposes are contemplated.

Equipment may be installed at the well to facilitate well operations. For example, a wellhead may be installed at the top of the well. A wellhead may refer to one or more components at the top/surface of the well that provides structural and/or pressure-containing interface for drilling and production equipment. For example, a wellhead may include spools, valves, and/or adapters that provide pressure control of a production well. A wellhead may allow for connection of various equipment to the well for production. For example, for an underwater well (e.g., a subsea well), one end of a riser may be connected to a wellhead of a well and the other end of the riser may be connected to a surface facility, such as a platform, floating production storage, and/or offloading vessels. A riser may include one or more pipe that delivers fluid between the well/wellhead and the surface facility. A riser may include one or more flexible components, floatation components, and/or components to facilitate use of the riser in an underwater environment.

Movement of water around the riser may place force on the riser to push the riser out of its neutral position above the wellhead. Movement of water around the riser may cause shifting, vibration, and/or other movement of the riser. Shifting, vibration, and/or other movement of the riser may fatigue/weaken the wellhead connected to the riser. Wellhead fatigue damage may accumulate over a period of time. Too much wellhead fatigue damage may result in failure or breakage of the wellhead.

Speed of water at the water surface may be used to estimate the wellhead fatigue damage. However, such estimation of wellhead fatigue damage has proven to be inaccurate. For example, use of surface current speed may result in overestimation of wellhead fatigue damage, which may cause operators to prematurely and/or unnecessarily stop operations at the well.

The present disclosure provides a tool/technique to more accurately assess wellhead fatigue damage (e.g., wellhead fatigue damage rate, wellhead fatigue damage accumulation) than the practice relying on surface current speeds to assess wellhead fatigue damage. Instead of relying on surface current speeds alone, the rate and/or accumulation of wellhead fatigue damage at a wellhead may be calculated by using a current profile of water movement speed along the riser. The current profile of water movement speed along the riser may be used to calculate integrated current load on the riser. The value of integrated current load may reflect both the current intensity and penetration depth of current energy that pushes on the riser. The value of integrated current load may be used as an indicator of how much fatigue is being experienced by the wellhead. For example, the value of integrated current load may be used as an indicator of the rate at which wellhead fatigue damage is being accumulated at the wellhead.

Figure 3:
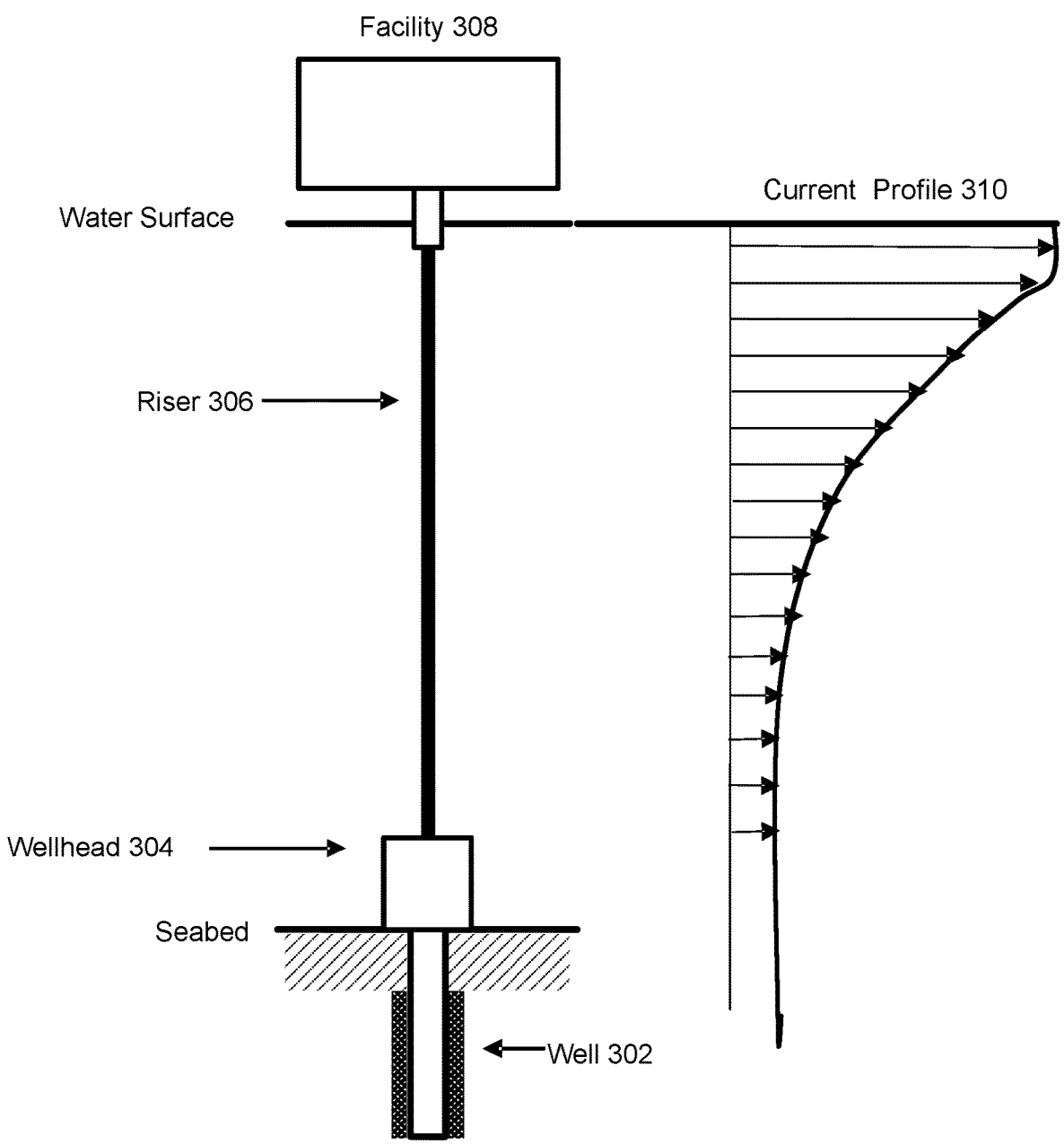
FIG. 3 illustrates an example current profile across a water column along a riser above a wellhead.

FIG. 3 illustrates an example well 302. The well 302 may be located under the water. For example, the well 302 may be located under the ocean/sea. A wellhead 304 may be installed on the well 302, and a riser 306 may be connected to the wellhead 304. The riser 306 may provide a connection through which fluid may flow between the well 302/wellhead 304 and a facility 308 at/above the water surface. The well 302 and/or the riser 306 may include other components not shown in FIG. 3 (e.g., blowout preventer, lower marine riser package, flexible joint, slick joint, buoyancy joint, water current sensor). For example, water current sensors may be placed along the riser 306 to measure the speed and direction of water around the riser 306.

The speed of water movement along the riser may not be uniform. For example, FIG. 3 shows an example current profile 310 for the riser 306. The current profile 310 may show the maximum direction and speed of water movement projected onto a two dimensional plane. The current profile 310 may represent the speed and direction of water along the water column along the riser 306, from the water surface to the seabed. The current profile 310 may characterize the speed of water movement across the water column along the riser 306. The current profile 310 may characterize the speed of water movement (current speed) as a function of water depth (e.g., depth below the water surface). As shown in the current profile 310, the speed of water movement may change with changing depth.

The integrated current load on the riser 306 may be determined using the current profile 310. For example, the integrated current load on the riser 306 may be calculated as the integral of the current profile 310. The value of integrated current load on the riser 306 reflect both the current intensity and penetration depth of current energy that pushes on the riser 306. The integrated current load on the riser 306 may be used to determine (e.g., calculate, estimate) the wellhead fatigue damage rate for the wellhead 304. For example, a forecast of the integrated current load on the riser 306 may be calculated for a future duration of time (e.g., next 48 to 72 hours) based on a forecast of current profile across the water column along the riser 306. The forecasted current load on the riser 306 may be used to determine the wellhead fatigue damage rate for the wellhead 304 for the future duration of time (e.g., next 48 to 72 hours).

Use of the current profile may enable wellhead fatigue damage rate to be determined differently based on different current load through the water column, rather than simply based on different surface current speeds. The current profile may provide a more accurate and comprehensive information on how the wellhead will be fatigued by the riser movement than the surface current speed.

Figure 4:
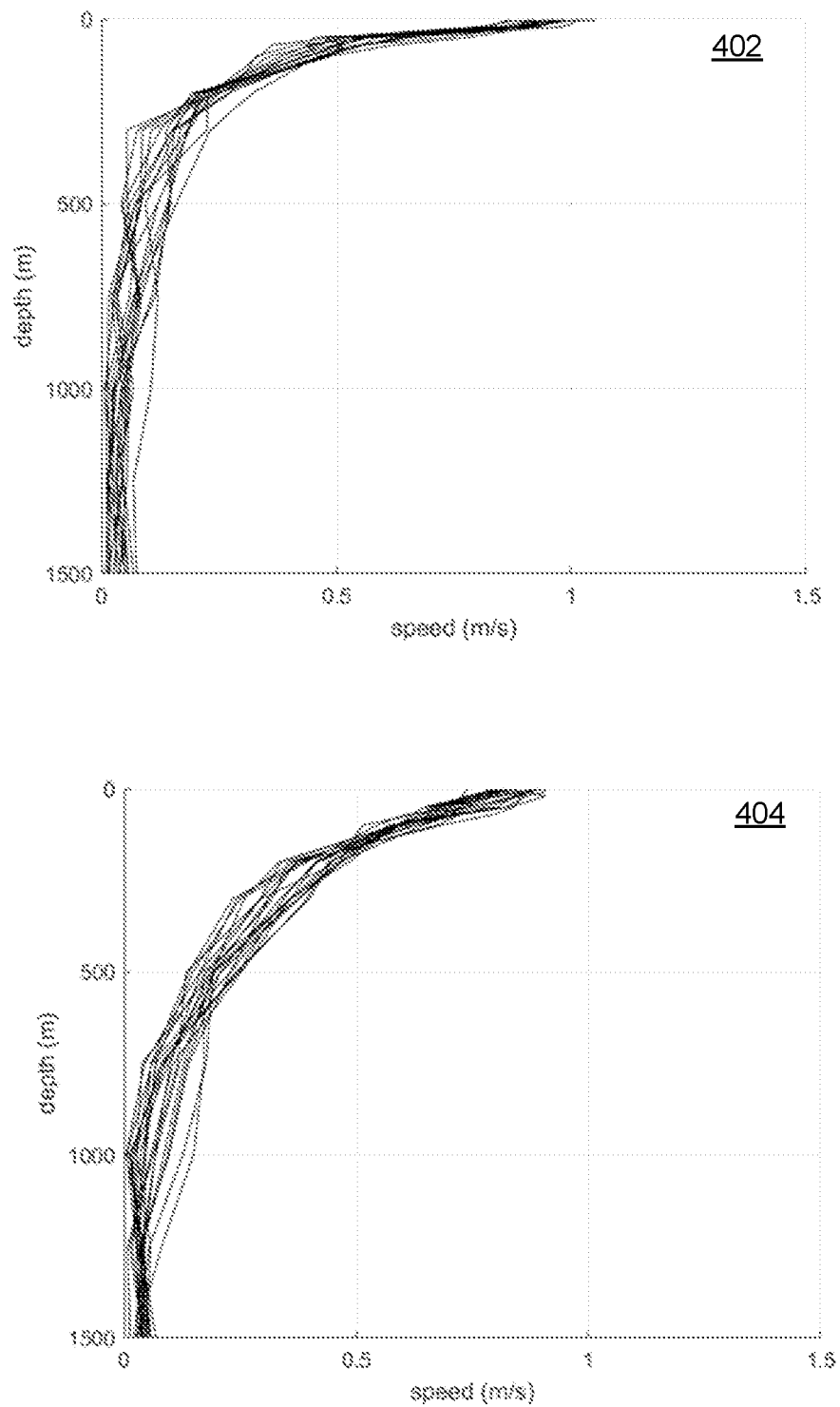
FIG. 4 illustrates example current profiles.

FIG. 4 illustrates example current profiles 402, 404. The current profiles 402, 404 may indicate speeds of water movement as a function of depth (e.g., from the water surface to depth of 1500 m). The current profiles 402, 404 show multiple current profile measurements for different water depths along different risers. The current profile 402 shows current speeds for a shallow and sheared current profile while the current profile 404 shows current speeds for a deep penetration current profile. While the current profile 402 has stronger surface current than the current profile 404, the total integrated load on the riser is higher with the current profile 404. While the surface current speed may be greater in the current profile 402, more energy is applied by the water movement speed to the riser in the current profile 404 because (1) the current speed drops quickly to weak background current in the current profile 402 while (2) the current speeds are maintained at higher magnitudes deeper into the water in the current profile 404. Thus, more accurate understanding of wellhead fatigue damage is obtained through the use of current profile (to obtain the integrated load along the riser) rather than through the use of surface current speeds alone.

Figure 5:
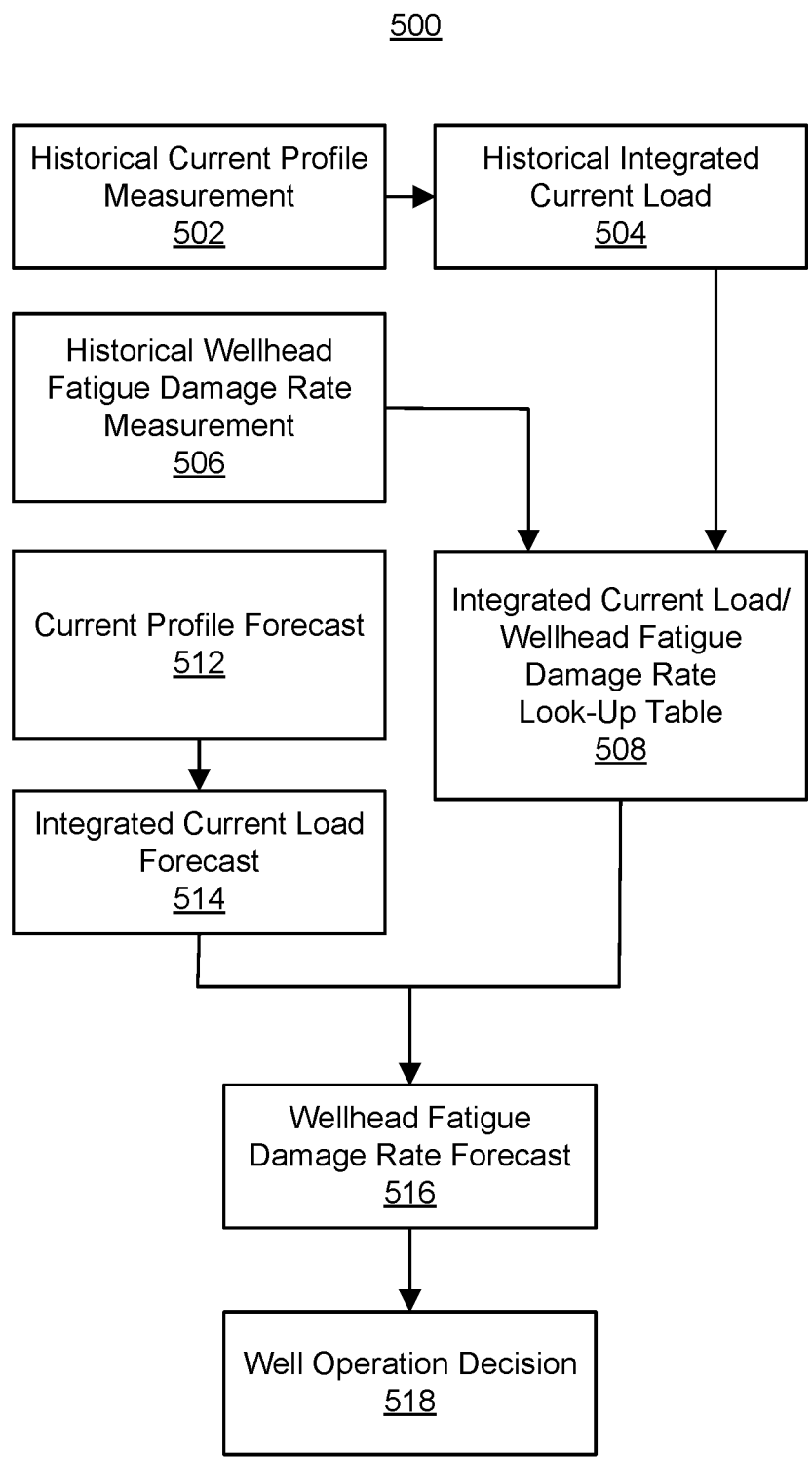
FIG. 5 illustrates an example process for using integrated current load as wellhead fatigue damage rate indicator.

FIG. 5 illustrates an example process 500 for using integrated current load as wellhead fatigue damage rate indicator. The process 500 may be used to convert a forecast of current speed around a riser for a future duration of time to predict how much wellhead fatigue damage will occur during the future duration of time. A similar process may be used to convert measured current speed around a riser for a period of time to determine how much wellhead fatigue damage has occurred.

In the process 500, historical current profile measurement 502 for a riser above a wellhead may be obtained. The historical current profile measurement 502 may include time series data to indicate the current profile around the riser at different moments (e.g., points in time, durations of time) in the past. The historical current profile measurement 502 may be converted into historical integrated current load 504 on the riser (e.g., integrated current load at different moments in the past). Historical wellhead fatigue damage rate measurement 506 may be obtained. The historical wellhead fatigue damage rate measurement 506 may include concurrent measurement of the rates at which the wellhead below the riser experienced fatigue damage. The wellhead fatigue damage rate measurement 506 may include time series data to indicate the wellhead fatigue damage rate at different moments in the past. The wellhead fatigue damage rate may be measured using displacement/movement of one or more components of the well/wellhead. For example, the wellhead fatigue damage rate may be measured using the displacement and/or the inclination angle of the blowout preventer installed on the wellhead. The wellhead fatigue damage rate may be measured as percentage values and/or other values. For example, the wellhead fatigue damage rate may be measured as a percentage of allowable damage experienced by the wellhead.

The historical integrated current load 504 (e.g., time series data of past integrated current load) and the historical wellhead fatigue damage rate measurement 506 (e.g., time series data of past wellhead fatigue damage rate) may be analyzed to determine the relationship/correspondence between values of integrated current load and values of wellhead fatigue damage rate. For example, a regression analysis may be performed on the historical integrated current load 504 and the historical wellhead fatigue damage rate measurement 506 to generate an integrated current load/wellhead fatigue damage rate look-up table 508. The integrated current load/wellhead fatigue damage rate look-up table 508 may establish relationship/correspondence between values of integrated current load and values of wellhead fatigue damage rate.

In some implementations, one or more weights may be used to determine relationship/correspondence between values of integrated current load and values of wellhead fatigue damage rate. For example, historical integrated current loads throughout the water column may be weighted differently for determination of the relationship (e.g., regression) between the historical integrated current loads on the riser and the historical wellhead fatigue damage rates for the wellhead. For instance, different values of historical integrated current load may be weighted differently in developing regression between values of integrated current load and values of wellhead fatigue damage rate. Small values of historical integrated current load and/or historical wellhead fatigue damage rates (e.g., values below a certain threshold) may be excluded from the regression calculation by use of weights (e.g., setting the weight to 0). Importance of small values of historical integrated current load and/or historical wellhead fatigue damage rates may be reduced in the regression calculation by use of weights (e.g., setting the weight to low value(s)). Such use of weights may prevent dilution of the regression analysis by clusters of small values.

The integrated current load/wellhead fatigue damage rate look-up table 508 may be used to convert values of integrated current load on the riser to values of wellhead fatigue damage rate. For example, the integrated current load/wellhead fatigue damage rate look-up table 508 may be used to convert past/current values of integrated current load on the riser to past values of wellhead fatigue damage rate. The integrated current load/wellhead fatigue damage rate look-up table 508 may be used to convert forecasted values of integrated current load on the riser to forecasted values of wellhead fatigue damage rate.

For example, in FIG. 5, a current profile forecast 512 may be obtained. The current profile forecast 512 may include a forecast of current profile for a future duration of time. The current profile forecast 512 may include a single current profile for the future duration of time (one current profile that covers the entire future duration) or multiple current profiles for the future duration of time (separate current profiles for different moments in the future duration). The current profile forecast 512 may be converted into an integrated current load forecast 514. The integrated current load forecast 514 may include a single forecasted value of integrated current load on the riser for the future duration of time (one value that covers the entire future duration) or multiple forecasted values of integrated current load on the riser for the future duration of time (separate values of for different moments in the future duration).

A wellhead fatigue damage rate forecast 516 may be determined using the integrated current load forecast 514 and the integrated current load/wellhead fatigue damage rate look-up table 508. The forecasted value(s) of integrated current load on the riser may converted into forecasted value(s) of wellhead fatigue damage rate using the integrated current load/wellhead fatigue damage rate look-up table 508. For example, forecasted value(s) of integrated current load on the riser may converted into prediction(s) of how much fatigue damage will be experienced by the wellhead.

The wellhead fatigue damage rate forecast 516 may include a single forecasted value of wellhead fatigue damage rate for the future duration of time (one value that covers the entire future duration) or multiple forecasted values of wellhead fatigue damage rate for the future duration (separate values of for different moments in the future duration).

The wellhead fatigue damage rate forecast 516 may be used to make well operation decision 518. For example, the wellhead fatigue damage accumulation calculated by integrating the wellhead fatigue damage rate forecast 516 over the period of the operation event may be compared with fatigue allowance for the operational event to determine whether the operation should proceed or not. If the wellhead fatigue damage accumulation is under the fatigue allowance, the operation may be allowed to proceed. If the wellhead fatigue damage accumulation is over the fatigue allowance for that operation event, the operation may not be allowed to proceed unless appropriate mitigations are in place. If the wellhead fatigue damage accumulation is over the fatigue allowance for that operation event, the riser may be disconnected from the wellhead to prevent/reduce fatigue damage to the wellhead.

The wellhead fatigue damage rate forecast 516 may assist well operators to make informed decisions from wellhead fatigue perspective as to whether one or more operations should be suspended or allowed to proceed. The process 500 may be repeated with real-time monitoring of the current conditions around the riser to make informed decisions for well operations. The process 500 may be repeated with real-time monitoring of the current conditions around the riser to increase (e.g., optimize) use of the well and avoid unnecessary non-use of the well (e.g., avoid disconnection from the well due to inaccurate forecast of wellhead fatigue damage rate)

In addition to providing more accurate assessment of wellhead fatigue damage rate, the process 500 may be more efficient and less costly than other wellhead fatigue monitoring systems. For example, placement and operation of sensors at the wellhead to measure wellhead fatigue (e.g., from displacement/inclination angle of blowout preventor) may be more difficult and/or more costly than placement and operation of water current sensors along the riser.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate using integrated current load as wellhead fatigue damage rate indicator. The machine-readable instructions 100 may include one or more computer program components. The machine-readable instructions 100 may include one or more of a current profile component 102, an integrated current load component 104, a wellhead fatigue component 106, a well operation component 108, and/or other computer program components.

The current profile component 102 may be configured to obtain current profile information and/or other information. Obtaining current profile information may include one or more of accessing, acquiring, analyzing, determining, examining, generating, identifying, loading, locating, measuring, opening, receiving, retrieving, reviewing, selecting, storing, and/or otherwise obtaining the current profile information. The current profile component 102 may obtain current profile information from one or more locations. For example, the current profile component 102 may obtain current profile information from a storage location, such as the electronic storage 13, electronic storage of a device accessible via a network, and/or other locations. The current profile component 102 may obtain current profile information from one or more hardware components (e.g., a computing device) and/or one or more software components (e.g., software running on a computing device). In some implementations, the current profile information may be obtained from one or more users. For example, a user may interact with a computing device to input the current profile information (e.g., upload the current profile information, specify the current profile for a well/wellhead/riser).

The current profile information may define a current profile across a water column along a riser above a wellhead. The riser may be connected to the wellhead. The current profile information may define a current profile by characterizing, describing, identifying, quantifying, reflecting, and/or otherwise defining the current profile. The current profile across the water column along the riser may characterize speed of water movement across the water column along the riser. The current profile may characterize speed of water movement by defining, describing, identifying, quantifying, reflecting, setting forth, and/or otherwise characterizing one or more of value, property, quality, quantity, attribute, feature, and/or other aspects of the speed of water movement. For example, the current profile may include a profile of speed and/or direction of water movement across the water column along the riser. The current profile may outline, describe, and/or represent the speed and/or direction of water movement across the water column along the riser.

In some implementations, the current profile information may include time series data. The time series data may indicate the current profiles at different moments. Rather than obtaining the current profile for a specific moment in time, the current profiles may be obtained for different moments in time. The current profile information may define changes in the current profile through time.

The current profile information may define a current profile by including information that defines one or more content, qualities, attributes, features, and/or other aspects of the current profile. For example, the current profile information may define a current profile by including information that specifies speed and/or directions of water movement across a water column along a riser as a function of position (e.g., depth) within the water column. The current profile information may define a current profile by including information from which speed and/or directions of water movement across a water column along a riser may be determined as a function of position within the water column. Other types of current profile information are contemplated.

The current profile may include a profile of water movement speed along the entire water column or for one or more parts of the water column. For example, the current profile may include a profile of speed and/or direction of water movement from the water surface to the mudline/seabed. The current profile may include a profile of speed and/or direction of water movement for the top part of the water column (e.g., top 500-750 m).

In some implementations, the current profile information may define a real-time current profile. A real-time current profile may characterize the current/present water movement speed across the water column along the riser. For example, a real-time current profile may include speed and/or direction of water movement currently being measured by one or more water current sensors. A real-time current profile may include speed and/or direction of water movement that has been measured within a threshold amount of time (e.g., water movement speed and/or direction measured within the past day/part of the past day).

In some implementations, the current profile information may define a historical current profile. A historical current profile may characterize the past water movement speed across the water column along the riser. For example, a historical current profile may include speed and/or direction of water movement measured in the past by one or more water current sensors. A historical current profile may include speed and/or direction of water movement that has been measured past a threshold amount of time (e.g., water movement speed and/or direction measured more than a day, a week, a month, or a year ago).

In some implementations, the current profile information may define a forecast of current profile. A forecast of current profile may characterize the predicted water movement speed across the water column along the riser. For example, a forecast of current profile may include speed and/or direction of water movement predicted in the future based on a real-time current profile, a historical current profile, and/or other information. A forecast of current profile may include speed and/or direction of water movement that has been predicted for a future duration of time (e.g., water movement speed and/or direction predicted for the next hour, the next day, the next few days, the next week). For example, a forecast of current profile may include speed and/or direction of water movement that has been predicted for the next 48 to 72 hours.

The integrated current load component 104 may be configured to determine integrated current load on the riser. Determining integrated current load on the riser may include ascertaining, approximating, calculating, establishing, estimating, finding, identifying, obtaining, quantifying, selecting, setting, and/or otherwise determining the integrated current load on the riser. Integrated current load on the riser may refer to load/force exerted on the riser by movement of water along the riser. Integrated current load on the riser may refer to aggregation of load/force exerted along the entire riser by movement of water along the riser. Integrated current load on the riser may refer to aggregation of load/force exerted along one or more parts of the riser (e.g., top 500-750 m of the riser) by movement of water along the part(s) of the riser. The value of the integrated current load on the riser may be used as an indicator of the rate at which the wellhead is experiencing fatigue damage. The integrated current load on the riser may be a better/more accurate indicator of wellhead fatigue damage rate than the surface current speeds. For example, correlation between the maximum surface current speeds and the wellhead fatigue damage rate may be lower than correlation between the integrated current load and the wellhead fatigue damage rate. For instance, wellhead fatigue, surface current speed, and current profile data for a wellhead may have a correlation value of 0.15 between the maximum surface current speeds and the wellhead fatigue damage rate and have a correlation value of 0.67 between the integrated current load and the wellhead fatigue damage rate.

The integrated current load on the riser may be determined based on the current profile across the water column along the riser and/or other information. The integrated current load on the riser may be determined by aggregating the water movement speed across the water column along the riser. For example, the integrated current load on the riser may be determined by integrating net speed values of water movement across the water column along the entirety of the riser or one or more parts of the riser. For instance, the integrated current load on the riser may be calculated by multiplying speed of water movement at particular depths by the corresponding depth bin sizes throughout the water column. Separate values of integrated current load on the riser may be determined for different moments in time.

In some implementations, determination of the integrated current load on the riser may include monitoring the current integrated current load on the riser. For example, a real-time current profile may be used to determine the present/current values of integrated current load on the riser. In some implementations, determination of the integrated current load on the riser may include determination of historical integrated current load on the riser for a period of time. For example, a historical current profile may be used to determine the past values of integrated current load on the riser for the period of time. In some implementations, determination of the integrated current load on the riser may include forecasting of the integrated current load on the riser for a future duration of time. For example, a forecast of current profile may be used to predict values of integrated current load on the riser for the future duration of time.

The wellhead fatigue component 106 may be configured to determine one or more wellhead fatigue damage rates for the wellhead. Determining a wellhead fatigue damage rate may include ascertaining, approximating, calculating, establishing, estimating, finding, identifying, obtaining, quantifying, selecting, setting, and/or otherwise determining the wellhead fatigue damage rate. A wellhead fatigue damage rate may refer to a rate at which fatigue damage is being accumulated at the wellhead. A wellhead fatigue damage rate may refer to a rate at which the wellhead is experiencing fatigue damage. In some implementations, a wellhead fatigue damage rate may be determined as a percentage value and/or other values. For example, a wellhead fatigue damage rate may be determined as a percentage of allowable damage of the wellhead. For example, an undamaged wellhead may have started with 100% allowable damage. A wellhead fatigue damage rate may be determined as how much of the allowable damage will be accumulated at the wellhead for a particular duration of time (e.g., 3% for 48-hour period).

The wellhead fatigue damage rate(s) for the wellhead may be determined based on the integrated current load on the riser and/or other information. The value(s) of the integrated current load on the riser may be used to determine the value(s) of wellhead fatigue damage rate for the wellhead. Separate values of wellhead fatigue damage rate may be determined for separate values of integrated current load on the riser.

In some implementations, determination of the wellhead fatigue damage rate(s) for the wellhead based on the integrated current load on the riser may include estimation of the wellhead fatigue damage rate(s) based on a relationship (e.g., regression) between historical integrated current loads on the riser and historical wellhead fatigue damage rates for the wellhead. For example, a regression analysis may be used to determine the relationship/correspondence between values of historical integrated current load on the riser and values of historical wellhead fatigue damage rate for the wellhead. The relationship/correspondence between values of historical integrated current load and historical wellhead fatigue damage rate may be stored in a look-up table. A value of wellhead fatigue damage rate for a value of integrated current load may be estimated by finding the value of the wellhead fatigue damage rate that matches/corresponds to the value of integrated current load in the look-up table. Use of other types of relationship between integrated current loads and wellhead fatigue damage rates are contemplated.

In some implementations, the historical integrated current loads throughout the water column may be weighted differently for determination of the relationship (e.g., regression) between the historical integrated current loads on the riser and the historical wellhead fatigue damage rates for the wellhead. For example, one or more thresholds may be used to exclude small values of historical integrated current load and/or small values of wellhead fatigue damage rate from the regression analysis.

In some implementations, the integrated current load/wellhead fatigue damage rate established for a well/wellhead may be used to determine wellhead fatigue damage rate(s) for another well/wellhead. For example, the integrated current load/wellhead fatigue damage rate established for a well/wellhead may be used with other wells/wellheads with similar/same physical characteristics (e.g., similar/same water depths, similar/same wellhead/riser configuration).

In some implementations, determination of the wellhead fatigue damage rate(s) for the wellhead based on the integrated current load on the riser may include calculation of the wellhead fatigue damage rate using one or more models. For example, a computer model may be generated to output a value of wellhead fatigue damage rate based on input of a value of integrated current load. For instance, a computer model may be trained using historical data (e.g., historical integrated current loads on the riser, the historical wellhead fatigue damage rates for the wellhead) to output the wellhead fatigue damage rate base on input of integrated current load. A computer model may be built to simulate fatigue damage rate on a wellhead based on integrated current load. Other types of models are contemplated.

In some implementations, determination of wellhead fatigue damage rate(s) for the wellhead may include monitoring/measuring the current wellhead fatigue damage rate on the wellhead with a measured current profile. For example, the present/current values of integrated current load on the riser may be used to determine real-time wellhead fatigue damage rate for the wellhead. In some implementations, determination of wellhead fatigue damage rate(s) for the wellhead may include determination of historical wellhead fatigue damage rate(s) for a period of time. For example, the past values of integrated current load on the riser for the period of time may be used to determine the past values of wellhead fatigue damage rate for the wellhead. In some implementations, determination of the wellhead fatigue damage rate(s) for the wellhead may include forecasting of the wellhead fatigue damage rate(s) for a future duration of time. For example, a forecast of integrated current load on the riser for the future duration of time may be used to predict values of wellhead fatigue damage rate for the future duration of time.

The well operation component 108 may be configured to facilitate one or more well operations. A well operation may refer to an operation relating to a well. A well operation may refer to performance of work on and/or use of a well. A well operation may refer to an activity involving a well. A well operation may refer to an operation of a well in which the riser is connected to the wellhead of the well. Facilitating a well operation may include making the well operation easier. Facilitating a well operation may include enabling/assisting in preparation, planning, and/or performance of the well operation. Other facilitations of well operations are contemplated.

The well operation(s) may be facilitated based on the wellhead fatigue damage rate(s) for the wellhead and/or other information. The wellhead fatigued damage rate(s) may be used to make operational decisions at the well. The wellhead fatigued damage rate(s) may be used to plan and/or perform well operations. For example, facilitation of a well operation based on the wellhead fatigue damage rate(s) for the wellhead may include presentation of information relating to the wellhead fatigue damage rate(s) on one or more displays, monitoring of the well operation based on information relating to the wellhead fatigue damage rate(s), planning of the well operation based on information relating to the wellhead fatigue damage rate(s), automation of the well operation based on information relating to the wellhead fatigue damage rate(s), and/or other facilitation of the well operation.

Information relating to the wellhead fatigue damage rate(s) may include the wellhead fatigue damage rate(s) itself, information derived from the wellhead fatigue damage rate(s), and/or information from which the wellhead fatigue damage rate(s) are derived. For example, information relating to the wellhead fatigue damage rate(s) may include a wellhead fatigue damage accumulation, remaining allowable wellhead fatigue damage, integrated current load, and/or other information.

The wellhead fatigue damage accumulation may refer to an amount of fatigue damage accumulated at/experienced by the wellhead. The wellhead fatigue damage accumulation may refer to an amount of fatigue damage accumulated at/experienced by the wellhead for the entire time since the wellhead has been installed at the well. The wellhead fatigue damage accumulation may refer to an amount of fatigue damage accumulated at/experienced by the wellhead for a particular duration of time/particular operation. The wellhead fatigue damage accumulation may be determined based on the wellhead fatigue damage rate(s) (e.g., real-time wellhead fatigue damage rate(s), past wellhead fatigue damage rate(s), forecasted wellhead fatigue damage rate(s)) and the duration of time corresponding to the wellhead fatigue damage rate(s). For example, the amount of fatigue damage accumulation at the wellhead may be determined based on how long the wellhead was in operation (e.g., connected to the riser) and the estimated wellhead fatigue damage rate(s) during the operation. As another example, amount of fatigue damage accumulation at the wellhead may be determined based on how long the wellhead was in operation and the real-time wellhead fatigue damage rate(s) observed during the operation.

The remaining allowable wellhead fatigue damage may refer to how much additional fatigue damage may be accumulated at/experienced by the wellhead before failure or breakage of the wellhead is expected. The remaining allowable wellhead fatigue damage may indicate the remaining "life" of the wellhead. The remaining allowable wellhead fatigue damage may be determined based on the wellhead fatigue damage accumulation. The remaining allowable wellhead fatigue damage may be determined by subtracting the original allowable wellhead fatigue damage (e.g., 100% for a new wellhead; less than 100% for an existing wellhead) by the wellhead fatigue damage accumulation.

In some implementations, the remaining allowable wellhead fatigue damage may be determined for a particular duration of time/particular operation. For example, a specific operational event may be assigned a fatigue allowance. The fatigue allowance may refer to a limit on how much fatigue damage may be accumulated/experienced by the wellhead for a particular duration of time/particular operation. The fatigue allowance may refer to maximum allowable fatigue damage accumulation for a particular duration of time/particular operation. The remaining allowable wellhead fatigue damage for a particular duration of time/particular operation may be determined by subtracting the fatigue allowance for the particular duration of time/particular operation by the wellhead fatigue damage accumulation during the particular duration of time/particular operation. Other information relating to the wellhead fatigue damage rate(s) is contemplated.

For example, the integrated current load, the wellhead fatigue damage rate(s), the wellhead fatigue damage accumulation, and/or the remaining allowable wellhead fatigue damage may be presented on one or more displays. Real-time wellhead fatigue damage rate(s), past wellhead fatigue damage rate(s), and/or forecasted wellhead fatigue damage rate(s) may be presented on the display(s). The wellhead fatigue damage rate(s) may be presented with corresponding time durations. For example, forecasted wellhead fatigue damage rate(s) may be presented along with the future duration (e.g., next 48 to 72 hours) in which the wellhead fatigue damage rate(s) were forecasted. The wellhead fatigue damage accumulation since the installation of the wellhead and/or the wellhead fatigue damage accumulation for a particular duration of time/particular operation may be presented on the display(s). The remaining allowable wellhead fatigue damage for the life of the wellhead and/or the remaining allowable wellhead fatigue damage for a particular duration of time/particular operation may be presented on the display(s). Operators may plan and/or make operational decisions for the well based on the information presented.

In some implementations, facilitation of the well operation(s) based on the wellhead fatigue damage rate(s) for the wellhead may include monitoring remaining allowable wellhead fatigue damage based on a wellhead fatigue damage accumulation and/or other information. The remaining allowable wellhead fatigue damage for the life of the wellhead and/or the remaining allowable wellhead fatigue damage for a particular duration of time/particular operation may be monitored. Monitoring the remaining allowable wellhead fatigue damage may include regularly calculating, checking, presenting, and/or otherwise monitoring the remaining allowable wellhead fatigue damage.

For example, monitoring the remaining allowable wellhead fatigue damage may include determining when the remaining allowable wellhead fatigue damage reaches one or more levels. Monitoring the remaining allowable wellhead fatigue damage may include determining when the remaining allowable wellhead fatigue damage is within a threshold value of one or more levels. Monitoring the remaining allowable wellhead fatigue damage may include presenting real-time values of remaining allowable wellhead fatigue damage on one or more displays. Monitoring the remaining allowable wellhead fatigue damage may include generating one or more alarms (e.g., more visual, audible, and/or haptic alarms) based on the remaining allowable wellhead fatigue damage reaching one or more levels/being within a threshold value of one or more levels.

In some implementations, one or more well operations may be performed/not performed based on Information relating to the wellhead fatigue damage rate(s). For example, an operation at a well may be stopped and the riser may be disconnected from the wellhead based on the remaining allowable wellhead fatigue damage reaching one or more levels/being within a threshold value of one or more levels. For instance, based on the remaining allowable wellhead fatigue damage for a particular operation reaching a certain level (e.g., a low value, 0%), the operation may be automatically stopped, and the riser may be disconnected from the wellhead to prevent further fatigue damage at the wellhead.

As another example, an operational event may be permitted or not permitted to proceed based on forecast of wellhead fatigue damage rate(s). An operational event may include one or more well operations. The forecast of wellhead fatigue damage rate(s) may be used to determine a wellhead fatigue damage accumulation for the operational event. The wellhead fatigue damage accumulation for the operational event may be determined based on the duration of the operational event and the wellhead fatigue damage rate(s) forecasted for the duration. The operational event may not be permitted to proceed based on the wellhead fatigue damage accumulation for the operational event exceeding the fatigue allowance for the operational event. The riser may be disconnected from the wellhead based on the wellhead fatigue damage accumulation for the operational event exceeding the fatigue allowance for the operational event.

On the other hand, the operational event may be permitted to proceed based on the wellhead fatigue damage accumulation for the operational event not exceeding the fatigue allowance for the operational event. Based on the forecast of wellhead fatigue damage accumulation for the operational event not exceeding the fatigue allowance for the operational event, the well operation(s) for the operational event may be permitted to proceed. Other control and/or automation of well operations based on information relating to the wellhead fatigue damage rate(s) are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
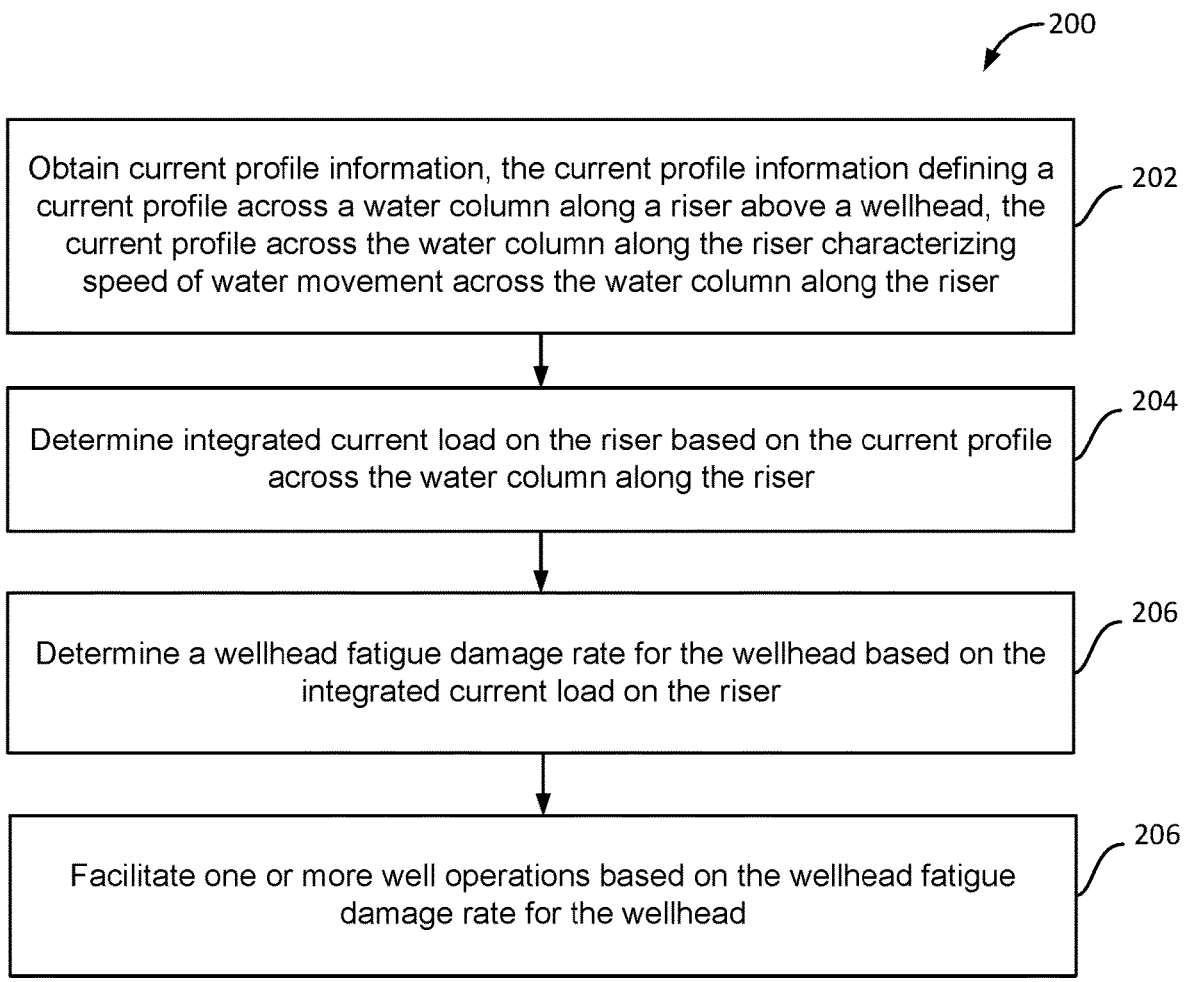
FIG. 2 illustrates an example method for using integrated current load as wellhead fatigue damage rate indicator.

FIG. 2 illustrates method 200 for using integrated current load as wellhead fatigue damage rate indicator. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, current profile information and/or other information may be obtained. The current profile information may define a current profile across a water column along a riser above a wellhead. The current profile across the water column along the riser may characterize speed of water movement across the water column along the riser. In some implementations, operation 202 may be performed by a processor component the same as or similar to the current profile component 102 (Shown in FIG. 1 and described herein).

At operation 204, integrated current load on the riser may be determined based on the current profile across the water column above the wellhead and/or other information. In some implementations, operation 204 may be performed by a processor component the same as or similar to the integrated current load component 104 (Shown in FIG. 1 and described herein).

At operation 206, a wellhead fatigue damage rate for the wellhead may be determined based on the integrated current load on the riser and/or other information. In some implementations, operation 206 may be performed by a processor component the same as or similar to the wellhead fatigue component 106 (Shown in FIG. 1 and described herein).

At operation 208, one or more well operations may be facilitated based on the wellhead fatigue damage rate for the wellhead and/or other information. In some implementations, operation 208 may be performed by a processor component the same as or similar to the well operation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for using integrated current load as wellhead fatigue damage rate indicator, the system comprising:
   one or more physical processors configured by machine-readable instructions to:
   obtain current profile information, the current profile information defining a forecast of current profile across a water column along a riser above a wellhead for a future duration of time, the current profile across the water column along the riser characterizing forecasted speed of water movement across the water column along the riser as a function of water depth for the future duration of time;
   determine a forecast of integrated current load on the riser in the future duration of time based on the forecast of current profile across the water column along the riser, the forecast of integrated current load including a forecast of aggregated load/force exerted along the riser by forecasted movement of water along the riser in the future duration of time, the forecast of integrated current load reflecting both current intensity and penetration depth of current energy that is forecasted to push on the riser;
   determine a forecasted wellhead fatigue damage rate for the wellhead based on the forecast of integrated current load on the riser and an integrated current load/wellhead fatigue damage rate look-up table, the integrated current load/wellhead fatigue damage rate look-up table establishing correspondence between values of integrated current load and values of wellhead fatigue damage rate, the integrated current load/wellhead fatigue damage rate look-up table generated based on historical integrated current loads on the riser and historical wellhead fatigue damage rates for the wellhead; and
   facilitate one or more well operations based on the forecasted wellhead fatigue damage rate for the wellhead, wherein the forecasted wellhead fatigue damage rate for the wellhead facilitates determination of remaining allowable wellhead fatigue damage for the wellhead.

2. The system of claim 1, wherein:
   a measured current profile for the riser is obtained;
   integrated current load experienced by the riser is determined based on the measured current profile;
   a wellhead fatigue damage rate experienced by the wellhead is determined based on the integrated current load experienced by the riser and the integrated current load/wellhead fatigue damage rate look-up table; and
   the one or more well operations are facilitated further based on the wellhead fatigue damage rate experienced by the wellhead.

3. The system of claim 1, wherein a value of the integrated current load on the riser is used as an indicator of a rate at which wellhead fatigued damage is accumulated at the wellhead.

4. The system of claim 1, wherein determination of the forecasted wellhead fatigue damage rate based on the forecast of integrated current load on the riser includes estimation of the forecasted wellhead fatigue damage rate based on a regression between the historical integrated current loads on the riser and the historical wellhead fatigue damage rates for the wellhead.

5. The system of claim 4, wherein the historical integrated current loads throughout the water column are weighted differently for determination of the regression between the historical integrated current loads on the riser and the historical wellhead fatigue damage rates for the wellhead.

6. The system of claim 1, wherein facilitation of the one or more well operations based on the forecasted wellhead fatigue damage rate includes disconnection of the riser from the wellhead based on a forecasted wellhead fatigue damage accumulation for a specific operational event exceeding a fatigue allowance for the specific operational event, the forecasted wellhead fatigue damage accumulation for the specific operational event determined based on the forecasted wellhead fatigue damage rate and a duration of the specific operational event.

7. The system of claim 6, wherein the facilitation of the one or more well operations based on the forecasted wellhead fatigue damage rate further includes permitting the one or more well operations for the specific operational event based on the forecasted wellhead fatigue damage accumulation for the specific operational event not exceeding the fatigue allowance for the specific operational event.

8. The system of claim 1, wherein facilitation of the one or more well operations based on the forecasted wellhead fatigue damage rate includes presentation of the forecasted wellhead fatigue damage rate on one or more displays.

9. The system of claim 8, wherein facilitation of the one or more well operations based on the forecasted wellhead fatigue damage rate further includes presentation of a forecasted wellhead fatigue damage accumulation on the one or more displays.

10. The system of claim 1, wherein facilitation of the one or more well operations based on the forecasted wellhead fatigue damage rate includes monitoring the remaining allowable wellhead fatigue damage based on a forecasted wellhead fatigue damage accumulation.

11. A method for using integrated current load as wellhead fatigue damage rate indicator, the method comprising:
  obtaining current profile information, the current profile information defining a forecast of current profile across a water column along a riser above a wellhead for a future duration of time, the current profile across the water column along the riser characterizing forecasted speed of water movement across the water column along the riser as a function of water depth for the future duration of time;
  determining a forecast of integrated current load on the riser in the future duration of time based on the forecast of current profile across the water column along the riser, the forecast of integrated current load including a forecast of aggregated load/force exerted along the riser by forecasted movement of water along the riser in the future duration of time, the forecast of integrated current load reflecting both current intensity and penetration depth of current energy that is forecasted to push on the riser;
  determining a forecasted wellhead fatigue damage rate for the wellhead based on the forecast of integrated current load on the riser and an integrated current load/wellhead fatigue damage rate look-up table, the integrated current load/wellhead fatigue damage rate look-up table establishing correspondence between values of integrated current load and values of wellhead fatigue damage rate, the integrated current load/wellhead fatigue damage rate look-up table generated based on historical integrated current loads on the riser and historical wellhead fatigue damage rates for the wellhead; and
  facilitating one or more well operations based on the forecasted wellhead fatigue damage rate for the wellhead, wherein the forecasted wellhead fatigue damage rate for the wellhead facilitates determination of remaining allowable wellhead fatigue damage for the wellhead.

12. The method of claim 11, wherein:
a measured current profile for the riser is obtained;
integrated current load experienced by the riser is determined based on the measured current profile;
a wellhead fatigue damage rate experienced by the wellhead is determined based on the integrated current load experienced by the riser and the integrated current load/wellhead fatigue damage rate look-up table; and
the one or more well operations are facilitated further based on the wellhead fatigue damage rate experienced by the wellhead.

13. The method of claim 11, wherein a value of the integrated current load on the riser is used as an indicator of a rate at which wellhead fatigued damage is accumulated at the wellhead.

14. The method of claim 11, wherein determining the forecasted wellhead fatigue damage rate based on the forecast of integrated current load on the riser includes estimating the forecasted wellhead fatigue damage rate based on a regression between the historical integrated current loads on the riser and the historical wellhead fatigue damage rates for the wellhead.

15. The method of claim 14, wherein the historical integrated current loads throughout the water column are weighted differently for determining the regression between the historical integrated current loads on the riser and the historical wellhead fatigue damage rates for the wellhead.

16. The method of claim 11, wherein facilitating the one or more well operations based on the forecasted wellhead fatigue damage rate includes disconnecting the riser from the wellhead based on a forecasted wellhead fatigue damage accumulation for a specific operational event exceeding a fatigue allowance for the specific operational event, the forecasted wellhead fatigue damage accumulation for the specific operational event determined based on the forecasted wellhead fatigue damage rate and a duration of the specific operational event.

17. The method of claim 16, wherein the facilitating the one or more well operations based on the forecasted wellhead fatigue damage rate further includes permitting the one or more well operations for the specific operational event based on the forecasted wellhead fatigue damage accumulation for the specific operational event not exceeding the fatigue allowance for the specific operational event.

18. The method of claim 11, wherein facilitating the one or more well operations based on the forecasted wellhead fatigue damage rate includes presenting the forecasted wellhead fatigue damage rate on one or more displays.

19. The method of claim 18, wherein facilitating the one or more well operations based on the forecasted wellhead fatigue damage rate further includes presenting a forecasted wellhead fatigue damage accumulation on the one or more displays.

20. The method of claim 11, wherein facilitating the one or more well operations based on the forecasted wellhead fatigue damage rate includes monitoring the remaining allowable wellhead fatigue damage based on a forecasted wellhead fatigue damage accumulation.

* * * * *